(12) United States Patent
Pärssinen et al.

(10) Patent No.: US 9,178,537 B2
(45) Date of Patent: Nov. 3, 2015

(54) RADIO FREQUENCY APPARATUS

(75) Inventors: Aarno Pärssinen, Espoo (FI); Tommi Zetterman, Espoo (FI); Antti-Veikko Piipponen, Tampere (FI); Kalle Raiskila, Nukari (FI)

(73) Assignee: Nokia Technologies Oy, Espoo (FI)

( * ) Notice: Subject to any disclaimer, the term of this patent is extended or adjusted under 35 U.S.C. 154(b) by 378 days.

(21) Appl. No.: 12/921,311

(22) PCT Filed: Jan. 12, 2009

(86) PCT No.: PCT/FI2009/000012
§ 371 (c)(1),
(2), (4) Date: Sep. 7, 2010

(87) PCT Pub. No.: WO2009/109687
PCT Pub. Date: Sep. 11, 2009

(65) Prior Publication Data
US 2011/0009069 A1    Jan. 13, 2011

(30) Foreign Application Priority Data
Mar. 6, 2008  (GB) .................................. 0804205.3

(51) Int. Cl.
*H04B 17/00*   (2015.01)
*H04B 1/00*    (2006.01)

(52) U.S. Cl.
CPC .................................. *H04B 1/0003* (2013.01)

(58) Field of Classification Search
None
See application file for complete search history.

(56) References Cited

U.S. PATENT DOCUMENTS

| | | | |
|---|---|---|---|
| 6,954,636 B2 * | 10/2005 | Matsuo et al. | ............... 455/418 |
| 7,016,668 B2 | 3/2006 | Vaidyanathan et al. | |
| 7,437,158 B2 | 10/2008 | Russell | |
| 7,623,879 B2 | 11/2009 | Honkanen et al. | |
| 7,787,844 B2 | 8/2010 | Piipponen et al. | |
| 8,060,035 B2 * | 11/2011 | Haykin | ...................... 455/115.1 |
| 2002/0103003 A1 | 8/2002 | Mauro | |
| 2003/0050055 A1 | 3/2003 | Ting et al. | |
| 2004/0123295 A1 | 6/2004 | Karam et al. | |
| 2005/0152322 A1 | 7/2005 | Dolwin et al. | |
| 2005/0235350 A1 | 10/2005 | Burgess | |
| 2006/0008035 A1 | 1/2006 | Larsson | |

(Continued)

FOREIGN PATENT DOCUMENTS

| | | |
|---|---|---|
| CN | 1593050 | 3/2005 |
| CN | 1701320 | 11/2005 |

(Continued)

OTHER PUBLICATIONS

Examination Report under Section 18(3) for UK Application No. GB0804205.3—Date of Report: Feb. 6, 2012, 2 pages.

(Continued)

*Primary Examiner* — Edward Urban
*Assistant Examiner* — Mohammed Rachedine
(74) *Attorney, Agent, or Firm* — Locke Lord LLP (57) ABSTRACT

An apparatus for controlling at least one radio module, wherein the apparatus is configured to generate at least one service request for a first radio mode, determine at least one logical architecture model dependent on each service request, select at least one of the plurality of radio modules to form a physical architecture structure dependent on each logical architecture model, and generate at least one configuration data set dependent on the selected one of the plurality of radio modules.

20 Claims, 4 Drawing Sheets

(56) References Cited

U.S. PATENT DOCUMENTS

| | | | |
|---|---|---|---|
| 2006/0046716 A1 | 3/2006 | Hofstaedter et al. | |
| 2006/0286937 A1* | 12/2006 | Russell et al. | 455/67.11 |
| 2007/0005327 A1* | 1/2007 | Ferris | 703/14 |
| 2007/0078924 A1 | 4/2007 | Hassan et al. | |
| 2007/0140161 A1 | 6/2007 | Silverman et al. | |
| 2007/0155345 A1* | 7/2007 | Wiegner et al. | 455/83 |
| 2007/0240161 A1* | 10/2007 | Prabhakar et al. | 718/104 |
| 2007/0280249 A1* | 12/2007 | Draves, Jr. | 370/392 |
| 2008/0002623 A1 | 1/2008 | Piipponen et al. | |
| 2008/0176518 A1* | 7/2008 | Pascht et al. | 455/67.11 |
| 2008/0293445 A1 | 11/2008 | Piipponen et al. | |
| 2008/0311852 A1* | 12/2008 | Hansen et al. | 455/41.2 |
| 2009/0291701 A1 | 11/2009 | Zetterman et al. | |
| 2010/0227588 A1 | 9/2010 | Bradley | |

FOREIGN PATENT DOCUMENTS

| | | | |
|---|---|---|---|
| EP | 1503603 | | 2/2005 |
| EP | 1503603 A2 | * | 2/2005 |
| EP | 1515448 | | 3/2005 |
| EP | 1515448 A1 | | 3/2005 |
| EP | 1750376 | | 2/2007 |
| EP | 1772967 A2 | * | 4/2007 |
| WO | WO03100647 | | 12/2003 |
| WO | WO2005038664 | | 4/2005 |
| WO | 2005084046 A1 | | 9/2005 |
| WO | WO 2005084046 A1 | * | 9/2005 |
| WO | 2007073406 A1 | | 6/2007 |
| WO | 2007125459 A1 | | 11/2007 |
| WO | WO 2007125459 A1 | * | 11/2007 |
| WO | 2008000903 A1 | | 1/2008 |
| WO | 2008000905 A1 | | 1/2008 |
| WO | 2008142149 A1 | | 11/2008 |

OTHER PUBLICATIONS

Office Action in U.S. Appl. No. 11/892,378, filed Aug. 22, 2007, sent electronically by USPTO on Apr. 1, 2011.

International Search Report and Written Opinion of the International Searching Authority for corresponding International Patent Cooperation Treaty Application PCT/FI2009/000012, dated May 25, 2009, 13 pages.

Great Britain Search Report for corresponding Great Britain Patent Application No. 0804205.3, dated May 29, 2009, 4 pages.

International Search Report and Written Opinion of the International Searching Authority for corresponding Patent Cooperation Treaty Application No. PCT/IB2008/051337 dated Apr. 3, 2009, 9 pages.

Office Action from related German Patent Application No. 11 2009 000 513.6 dated Jun. 10, 2011, 10 pages.

* cited by examiner

RADIO FREQUENCY APPARATUS

RELATED APPLICATION

This application was originally filed as PCT Application No. PCT/FI2009/000012 filed Jan. 12, 2009, which claims priority to Great Britain Patent Application No. 0804205.3, filed Mar. 6, 2008.

FIELD OF THE INVENTION

The present invention relates to a radio frequency (RF) apparatus, and a method of configuring a radio frequency apparatus.

BACKGROUND OF THE INVENTION

A communications device can be understood as a device provided with appropriate communication and control capabilities for enabling use thereof for communication with other parties. The communication may comprise, for example, communication of voice, electronic mail (email), text messages, data, multimedia and so on. A communication device typically enables a user of the device to receive and transmit communications via a communications system and can thus be used for accessing various applications.

A communications system is a facility which facilitates the communication between two or more entities such as the communications devices, network entities and other nodes. An appropriate access system allows the communications device to access the communications system. An access to the communications system may be provided by means of a wireless communication interface.

Communications systems providing wireless access typically enable at least some mobility for the users thereof. Examples of these include cellular wireless communications systems where the access is provided by means of access entities called cells. Other examples of wireless access technologies include different wireless local area networks (WLANs) and satellite based communications systems.

A wireless communications system typically operates in accordance with a wireless standard and/or with a set of specifications which set out various aspects of the wireless interface. For example, the standard or specification may define if the user, or more precisely user equipment, is provided with a circuit switched bearer or a packet switched bearer, or both. Communication protocols and/or parameters which should be used for a wireless connection are also typically defined. For example, the frequency band or bands to be used for the communications are typically defined.

A portable communications device may be provided with so called multi-radio capabilities. That is, a portable device may be used for communication via a plurality of different wireless interfaces. An example of such device is a multimode cellular phone, for example a cellular phone that may communicate in at least two of the GSM (Global System for Mobile communications) frequency bands 850, 900, 1800 and 1900 MHz or a cellular phone that may communicate based on at least two different standards, for example a cellular phone which may operate on at least two of the GSM access network, the CDMA (Code Division Multiple Access) access network, and a WCDMA (Wideband CDMA) based access network as used in the UMTS (Universal Mobile Telecommunications System).

A mobile or portable device may also be configured for communication via at least one cellular system and at least one non-cellular system. Non-limiting examples of the latter include short range radio links such as Bluetooth™, other access networks such as wireless local area networks (WLAN) and ultra wide band (UWB).

Furthermore a mobile or portable device may also be configured for receiving information broadcast systems, non limited examples including those based on the Digital Video Broadcasting via Handheld Terminals (DVB-H), and global positioning system (GPS).

Such communications devices can be implemented with software defined radio (SDR) methods. In an SDR system, a radio receiver/transmitter can be configured to potentially tune to any frequency band and receive/transmit any known modulation scheme across a large frequency spectrum and process signals through the use of software.

A multi radio communications device equipped with SDR capabilities may have to be able to handle simultaneously more than one active radio connection. This increases the required complexity of any RF system on chip (RF SOC) in the communications device since the RF SOC has to enable cooperation in the control plane between the different communication systems in order to enable seamless multi radio operation. The complexity of such RF system on chip designs is also increased as any cost effective design involving multi radio communication capability will require some sharing of common resources of which the shared resources need to be controlled and allocated when necessary.

The increased complexity of such designs has meant that it is unfeasible for a single design team to produce a RF system on chip (SoC) design and it is currently best practice for some parts of the RF SoC to be designed inside a company by one or more teams, whilst the design of other parts of the RF SoCs is sub-contracted out to external designers, and other parts of the RF SoC formed from recycled previous designs.

It is thus desirable for such RF Systems on Chip designs to have a modular architecture allowing easy integration of various components of the RF. However the arrangement and operation of such architectures is difficult to implement, particularly in software defined radio systems when it is required to be able to make changes to the operation of the RF modules.

There have been developments with respect to the creation of low level hardware driver interfaces, however these typically are limited to dealing with only one level of extraction. For example there has been an initiative to parameterize the RF hardware and circuitry by such forum and standards groups as the Software Defined Radio forum and the Object Management Group (OMG) with their Software Communications Architecture (SCA).

These existing approaches however lack flexibility, especially when possible hardware architecture changes are required to be implemented.

SUMMARY OF THE INVENTION

According to a first aspect of the present invention, there is provided an apparatus for controlling at least one radio module, wherein the apparatus is configured to generate at least one service request for a first radio mode, determine at least one logical architecture model dependent on each service request, select at least one of the plurality of radio modules to form a physical architecture structure dependent on each logical architecture model, and generate at least one configuration data set dependent on the selected one of the plurality of radio modules.

According to some embodiments of the present invention the apparatus may be further configured to write the at least one configuration data set to the selected at least one of the plurality of radio modules. The apparatus may be further configured to read at least one configuration data set from the selected at least one of the plurality of radio modules, or the apparatus may be further configured to read and/or write the at least one configuration data set via a control interface. The at least one configuration data set may comprise at last one value for a parameter associated with the selected one of the plurality of radio modules.

According to some embodiments of the present invention, the apparatus may be further configured to select the at least one of the plurality of radio modules further dependent on the at least one configuration data set. The apparatus may be further configured to determine the at least one logical architecture model dependent on the selected at least one of the plurality of radio modules. The apparatus may be further configured to receive a first radio mode configuration data associated with the first radio mode comprising an indication of at least one of a radio communication protocol, a radio frequency, a modulation type; a transmission power output limit, and a timing slot value. The apparatus may be further configured to generate at least one further service request for a second radio mode dependent on the at least one service request.

According to one embodiment of the present invention, the apparatus may be further configured to determine at least one further logical architecture model dependent on the at least one further service request, select at least one of the plurality of radio modules to form a physical architecture structure dependent on each further logical architecture model, and generate at least one further configuration data set dependent on the selected one of the plurality of radio modules.

According to a second aspect of the present invention, there is provided a method for controlling at least one radio module, the method comprising generating at least one service request for a first radio mode, determining at least one logical architecture model dependent on each service request, selecting at least one of the plurality of radio modules to form a physical architecture structure dependent on each logical architecture model, and generating at least one configuration data set dependent on the selected one of the plurality of radio modules.

According to some embodiments of the present invention, the method may further comprise writing the at least one configuration data set to the selected at least one of the plurality of radio modules. The method may further comprise reading at least one configuration data set from the selected at least one of the plurality of radio modules. The method may further comprise reading and/or writing the at least one configuration data set via a control interface. The at least one configuration data set may comprise at last one value for a parameter associated with the selected one of the plurality of radio modules. Selecting the at least one of the plurality of radio modules may be further dependent on the at least one configuration data set. Determining the at least one logical architecture model may be further dependent on the selected at least one of the plurality of radio modules.

According to a further embodiment of the present invention, the method may further comprise receiving a first radio mode configuration data associated with the first radio mode comprising an indication of at least one of a radio communication protocol, a radio frequency, a modulation type, a transmission power output limit, and a timing slot value. The method may further comprise generating at least one further service request for a second radio mode dependent on the at least one service request.

According to a further embodiment of the present invention, the method may further comprise determining at least one further logical architecture model dependent on the at least one further service request, selecting at least one of the plurality of radio modules to form a physical architecture structure dependent on each further logical architecture model, and generating at least one further configuration data set dependent on the selected one of the plurality of radio modules.

According to a further aspect of the present invention, there is provided a radio transceiver apparatus comprising the described apparatus. There may further be provided a software defined radio apparatus comprising the described apparatus. There may be further provided a multiradio apparatus comprising said software defined radio.

According to a further aspect of the present invention there is provided a computer program product configured to perform a method for controlling at least one radio module, comprising generating at least one service request for a first radio mode, determining at least one logical architecture model dependent on each service request, selecting at least one of the plurality of radio modules to form a physical architecture structure dependent on each logical architecture model, and generating at least one configuration data set dependent on the selected one of the plurality of radio modules.

According to a further aspect of the present invention, there is provided an apparatus for controlling at least one radio module, comprising processing means for generating at least one service request for a first radio mode, second processing means for determining at least one logical architecture model dependent on each service request, third processing means for selecting at least one of the plurality of radio modules to form a physical architecture structure dependent on each logical architecture model, and fourth processing means for generating at least one configuration data set dependent on the selected one of the plurality of radio modules.

BRIEF DESCRIPTION OF DRAWINGS

For a better understanding of the present invention, embodiments thereof together with examples of features and operations of the embodiment will now be described, by way of example only, with reference to the accompanying figures in which.

DESCRIPTION OF PREFERRED
EMBODIMENTS OF THE INVENTION

Figure 1:
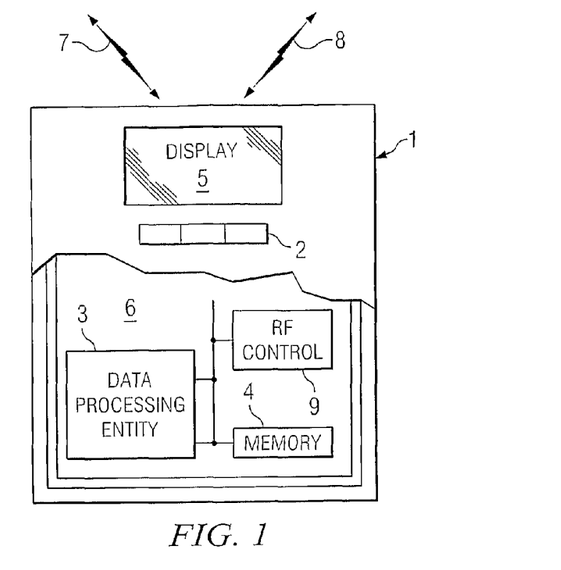
FIG. 1 shows schematically a wireless communications device in which embodiments of the present invention can be used.
Figure 2:
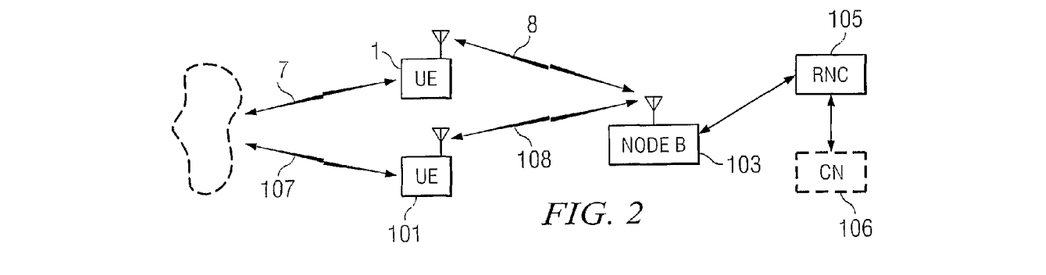
FIG. 2 shows an example of a communication system in which the communications device shown in FIG. 1 can be used.

With reference to FIGS. 1 and 2, a wireless communications device 1 which may employ embodiments of the invention is shown. The wireless communications device may be used to provide access for various services and/or applications via a wireless or radio interface.

A portable wireless device 1 can typically communicate wirelessly via at least one radio access network node, for example in GSM network a base transceiver station (BTS), or directly with another communication device.

The portable wireless device 1 may have one or more radio channels open at the same time with one or more different radio access networks and may have communication connections with more than one other party. A portable communication device 1 may be provided by any device capable of at least one of sending or receiving radio signals. Non-limiting examples include a mobile station (MS), a portable computer provided with a wireless interface card or other wireless interface facility, personal data assistant (PDA) provided with wireless communication capabilities, or any combinations of these or the like.

The portable wireless device 1 of FIG. 1 can be used for various tasks such as making and receiving phone calls, for receiving and sending data from and to a data network and for experiencing, for example, multimedia or other content.

The portable wireless device 1 comprises at least one data processing entity 3 and at least one memory 4, or storage entity, for use in tasks it is designed to perform. The data processing 3 and storage entities 4 can be provided on an appropriate circuit board and/or in chipsets. The circuit boards and/or chipsets further comprise one or more configurable RF circuits 9. The one or more configurable RF circuits 9 are able to be controlled by the data processing entity 3.

In other embodiments of the invention the data processing entity 3 or the storage entity 4 directly control the RF circuits 9.

Non limiting examples of the types of RF circuits which may be found within the portable wireless device 1 comprise mixer circuits, modulator circuits, filter circuits, switch circuits, amplifier circuits, antenna circuits, and baseband signal processing circuitry. The circuitry may dependent on the configuration of the registers or by directly controlling from the processing entity may configure the RF circuitry 9 to provide both analogue and digital signal processing functionality.

The user can control operation of the portable wireless device 1 by means of a suitable user interface such as key pad 2. Furthermore the portable wireless device may comprise a display 5 to provide the user an indication of the state of the portable wireless device 1.

The device 1 may be enabled, using the at least one RF circuit 9 controlled by the data processing entity 3 and storage entity 4, to communicate wirelessly on a number of different wireless access network systems and frequency bands. This capability is illustrated in FIG. 1 by the stylized two wireless signals 7 and 8. A non limiting list of possible access networks the wireless device may communicate with includes global system for mobile communications (GSM), general packet radio service (GPRS), enhanced GPRS, universal mobile telecommunications system (UMTS) terrestrial radio access network (UTRAN), evolved UTRAN, high speed packet access (HSPA), wireless local area network (WLAN), and worldwide interoperability for microwave access (WiMAX) or any of their extensions like wideband code division multiple access (WCDMA), High-Speed Downlink Packet Access (HSDPA), High Speed Uplink Packet Access (HSUPA), and long term evolution (LTE) in the case of the $3^{rd}$ Generation partnership project/universal mobile telecommunications system (3GPP/UMTS). However it would be understood to the person skilled in the art that any suitable wireless communication system may be used to communicate to and from the wireless device.

Furthermore the wireless device 1, using the at least one RF circuit 9 controlled by the data processing entity 3 and storage entity 4, may also communicate over short range radio links such as a Bluetooth™ link.

In further embodiments of the invention, using the at least one RF circuit 9 controlled by the data processing entity 3 and storage entity 4, the wireless device may further receive wireless broadcast transmissions such as global positioning system (GPS) and Galileo, and signals for assisting in location estimation of the wireless device 1, or Digital Video Broadcasting via Handheld Terminals (DVB-H) for television or radio programming.

This type of arrangement, as shown in FIG. 1, is one in which it is possible to implement software defined radio (SDR) methods. The embodiments of the invention may separate the radio frequency (RF) platform in control domain (implemented by the data processing entity 3) from a radio protocol stack of the RF hardware (implemented in the at least one RF circuit 9).

FIG. 2 is a simplified illustration of a communications system to which embodiments according to the invention may be applicable. FIG. 2 shows a part of a UMTS radio access network (UTRAN). The UTRAN is a radio access network which includes wideband code division multiple access (WCDMA) technology.

The communications system shown in FIG. 2 is a cellular radio system which comprises a base transceiver station (or node B 103), which has bi-directional radio links 8, 108 with the wireless devices 1, 101 similar to those described previously. As can be seen in FIG. 2, the wireless devices may also communicate, shown by communication links 7, 107, with a separate radio access network shown by cloud 14.

The node B 103 may include transceivers connected to an antenna unit that establishes the bi-directional radio links to the devices 1, 101. The node B 103 is further connected to a radio network controller 105 (RNC), which may transmit and receive data to and from the devices 1, 101 to the other parts of the network. The radio network controller 105 furthermore controls in a centralised manner several node Bs 103 connected to it. The radio network controller 105 is further connected to a core network (CN) 106. Depending on the system, the counterpart on the CN 106 side can be mobile services switching centre (MSC), a media gateway (MGW) or a serving GPRS (general packet radio service) support node (SGSN).

In some embodiments of the invention the functionality of the RNC 105 may be distributed among node B elements 103.

The embodiments of the invention are not restricted to the above radio access network given as an example, but a person skilled in the art may apply the solution to other communications system provided with the necessary properties.

Figure 3:
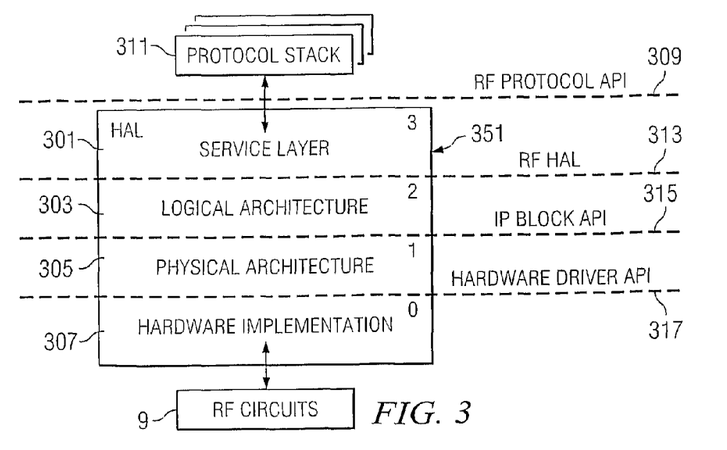
FIG. 3 shows illustratively an embodiment of a radio frequency circuitry and the software control entity organised into hardware abstraction layers in accordance with the embodiment.

FIG. 3 shows illustratively how embodiments of the invention may provide logical separation in the control domain of RF hardware from the radio protocol stack. Separation is provided by use of a generalized hardware abstraction layer (HAL) 351, which provides a common, protocol-independent control interface 309, or RF Protocol API, towards all protocol stacks 311.

The logical control interface 309 carries information between the protocol stacks 311 and the HAL 351. In particular, this interface allows information elements identifying the constant parameters of the used radio protocol to be passed to the HAL 351, in order to allow the relevant hardware circuits to be correctly configured. Synchronization services to ensure that the protocol and the HAL share a common concept of time also use messages passed over the control interface 309. Furthermore, dynamic operation requests may be issued over the control interface to meet requirements of the protocol communication during operation.

In one embodiment of the present invention, the information relating to the constant parameters for each specific radio protocol that may be used, are hardcoded in to the HAL 351. This means that for all supported protocols, the information, relating to the protocol requirements, for instance how to setup the RF hardware to implement that protocol, is coded into the HAL at design time. This may have advantages relating to testing and reliability of the HAL 351. However, if a new protocol is to be supported it would be necessary to modify the HAL 351.

In an alternative embodiment, the information elements defining the radio protocol may be passed to the HAL 351, according to some standardised format, using the common control interface 309.

Whilst the information elements have been described in the context of a single radio protocol, the common interface 309 may be duplicated, logically, to provide access to the HAL for a plurality of protocol stacks 311.

The HAL 351 also communicates directly with the Radio Frequency Circuits 9, using hardware specific interfaces. The RF circuits may comprise any programmable building block, from antenna to baseband signal processing, that provide dedicated analog or digital signal processing functionality with a possibility to configure a signal path, or its properties. Control of the hardware blocks is typically performed by writing to registers. The HAL 351 may be able to control these RF circuits 9 in order to meet the requirements of the Protocol stacks 311.

In the illustrated example, the HAL structure 351 comprises four internal abstraction layers, the service layer 301, the logical architecture layer 303, the physical architecture layer 305 and the hardware implementation layer 307. However, it is envisaged that the functionality of the HAL structure could be provided by fewer than four abstraction layers, or may be partitioned into more than four abstraction layers.

While the HAL 351 presents a generic control interface 309 to the protocol stacks 311, the underlying hardware contained within the RF Circuits 9 may be specific to individual communication protocols. However in some embodiments of the invention is may be possible to implement protocol flexible circuitry, controllable by software, for example by implementing vector processors to carry out the signal processing. It is important for the HAL 351 to have information identifying required constant parameters of the RF circuitry blocks (i.e. the protocol specific configuration) in order that the HAL can match the requirements of a protocol with the abilities of the RF circuit block 9.

As mentioned above, a number of ways have been envisaged for passing protocol requirements, defining how the hardware must be configured for the protocol, to the HAL. For a fully configurable and 'protocol independent' HAL, the description of the required radio signal properties, or ontology of the required signal, must be established between the HAL and the protocol. For example, the protocols and the HAL may negotiate the signal processing (i.e. hardware) requirements of the protocol, and the HAL may then configure the hardware elements based on those requirements. The signal properties may comprise one or more of, for example, RF band, channel bandwidth, crest factor, transmit output power, and spectrum mask.

In embodiments of the invention the means to establish the radio protocol stack is preferably realised by a computer program. Furthermore in embodiments of the invention the HAL is implemented preferably by a computer program operating on a data processor 3.

In an alternative embodiment of the present invention, the protocol requirements are defined inside the HAL 351 in some format. Adding support for new protocols for this embodiment, will therefore, require changes in the HAL. In the simplest form, the HAL may contain pre-defined values for the hardware configuration registers. The HAL is then able to select the correct value corresponding to the protocol if a protocol requiring the use of the block controlled by that register is used.

In some embodiments of the present invention, it may be possible to combine elements of a fully configurable HAL with elements of a HAL containing pre-defined protocol requirements. For example, the HAL may be set up for operation with static protocol information relating to a set of protocols, but may additionally be capable of being informed of any new requirements of a protocol or a new protocol.

The radio protocol configuration information may be static or dynamic in nature. Examples of static configurations include GSM1800 using the 1800 MHz GSM band and 200 kHz channel bandwidth. Examples of more dynamic configurations include a protocol in which the transmitted bursts may be either basic GSM, using GMSK modulation, or EDGE, using 8-PSK, with a selection of the type of modulation made upon request from the base station (BS).

In some embodiments of the invention the HAL may select the appropriate protocol configuration information from the stack dependent on a protocol required. Furthermore the HAL may in some embodiments of the invention determine that the hardware implementation layer can satisfy the requirements imposed by the protocol or determine that those requirements are satisfied only in part.

The control interface 309 furthermore is configured to assist in the passing of time synchronisation information for synchronization of the RF circuitry and HAL 351 processing in the data processing entity 3.

In embodiments of the invention the RF circuitry blocks comprise hardware and/or software configured to keep an accurate time for each supported radio protocol. This may be achieved, for example, using hardware system time counters and higher-level software counters. The accurate time values may be used to activate and de-active the RF circuitry blocks 9 at appropriate times to ensure proper operation of the communications device according to a specification of a particular standard or protocol. Since in the embodiments of the invention described above communication is possible using more than one communications system/protocol, it is important that the clock signals are synchronised between all protocols in use and the HAL 351.

The control interface synchronises each protocol to a respective time counter and the time counters are synchronised to each other. Set up information for the time counter associated with a protocol may be defined in the radio protocol configuration information. The reason for synchronisation is the possibility for a control processor and a control bus for access to the RF circuitry 9 may not share the same clock domain as the supported protocols in a multi-radio system.

In another embodiment, an arbitrary clock domain is used in the HAL 351 which is not necessarily a protocol specific clock time. In this embodiment the control interface may be used to translating between the protocol specific time and other clock domains such as the arbitrary clock domain selected by the HAL 351. This clock synchronisation may be carried out in a similar way to PCT patent application No. WO 2008/000903 A1.

In either embodiment, synchronisation is achieved by the control interface 309. However, it is not essential for physical clock signals to be transmitted over the control interface 309—only that information to allow synchronisation to take place be transmitted.

Furthermore the control interface may in embodiments of the invention permit dynamic operation requests to meet protocol communication needs.

Where the RF circuitry 9 comprises a transceiver chain comprising various blocks/elements as described above, dynamic operation may refer herein to the following operations:

1. The setting of performance settings of the RF circuitry blocks/elements. The performance settings may comprise the at least one receive and/or transmit carrier frequency, and the output power of the transmitter in the RF hardware. These performance settings are typically provided by the protocols of the radio protocol stack as interpreted by the layers of the HAL 351. The control interface 309 may use a predetermined unit, for example hertz, watts or dBm, in order to maintain protocol independency. This contrasts with conventional approach where protocol-specific channel numbers and power classes are specified.

If a selected protocol uses an automatic frequency correction scheme, a further example of a measured quantity is the frequency error. The frequency error measured outside the HAL 27 may be supplied to the HAL via the control interface 309.

Furthermore another type of performance setting relates to link quality parameters such as receiver signal-to-noise ratio margin and signal-to-interference ratio margin. In embodiments of the invention the HAL 27 may determine that a margin is above a predetermined threshold margin, and reduce via the control interface 309 the hardware power consumption.

2. The timely activation and de-activation of the RF circuitry blocks/elements. Commands from the HAL 351 to the RF circuitry elements 9 for activation and de-activation of the elements therein preferably include information on time periods for power measurement, for example to indicate when received signal strength measurements are to be taken.

3. Reporting of measured quantities, such as a received signal strength, to the HAL for interpretation by the layers in the HAL 351. During dynamic operation, the HAL 351 can, if supplied with some or all of the above mentioned measured quantities and performance settings, run some algorithms forming part of the protocols independently, that is, without need for communication with the radio protocol stack. Such algorithms include those relating to, for example, automatic gain control and gain partitioning. The logical architecture layer 303 may manage and controls the running of such algorithms and thus control the RF circuit elements via the control interface 309.

In embodiments of the invention the HAL layers form a hierarchical driver scheme or interface scheme. A driver for implementing such a scheme is herein referred to as a "HW driver". These are discussed in further detail below.

To further understand the present invention we will now discuss each abstraction layer of the HAL 351 in turn, i.e. the service layer 301, the logical architecture layer 303, the physical architecture layer 305 and the hardware implementation layer 307 implemented in the HAL 351. Firstly, the following table summarizes the different layers of the HAL 351.

| Name | Description | Time concept | Example |
|---|---|---|---|
| 3 Service layer | Generic, architecture independent functionality, translates protocol commands to RF internal services. | Radio protocol time | Configure RX chain (in general, RX architecture independent). Defines agc algorithm at high abstraction level (RX path architecture independent). RF services can be internal or external. Turn receiver ON/OFF is an external service and AGC an internal service. |
| 2 Logical architecture layer | Generic RF architecture description and interface configuration between building blocks. Maps RF services to certain architecture and functional partitioning (Block level partitioning). Optimizes performance partitioning in the signal processing elements. | Control system common time | Defines what RF IP blocks are needed to construct RF chain (e.g. DiCoRX) |
| 1 Physical architecture layer | Implementation-aware IP block drivers. Define necessary HW parameters and report them to layer 2. Maps controls to logical register names. | — | Defines what gain values and steps are available for RF IP block. Defines possibly also certain tunable attributes like noise figure as a function of the gain value. |
| 0 HW implementation layer | Defines register mapping and links RF IP block drivers actual HW (by implementation dependent low level HW drivers conforming RF HAL). | Realtime (i.e. microseconds) | Defines the correct configuration register bit pattern needed to configure desired gain setting for RF IP block. |

The service layer 301, can be considered to be the layer with the highest level of abstraction from the implementation of the RF circuitry. The service layer 301 may contain generic architecture independent functions and operates independently of the underlying RF circuits 9. Communications between the service layer and the protocol stack takes place via the generic control interface (RF Protocol API) 309. The service layer 301 receives commands over the RF Protocol API 309, and translates the generic protocol commands to RF internal service functions. In the case of protocol requirements being hardcoded into the HAL 351, then the service layer may not be truly architecture independent.

These functions operate over a time span controlled by the radio protocol time, that is, the functions use time as defined by the radio protocol stack (the time periods defined by the communication system being implemented).

An example of the operation of the service layer might be the translation of a generic configure receive chain command, which would, in general, be receive architecture independent. The result of such a translation for example would be to define various algorithms or services at a high abstraction level which would be necessary to receive a required signal. These services may be internal (i.e. not requiring input from outside), for example an "automatic gain control (AGC)" algorithm or service (RX path architecture independent) or the service/algorithm may be external such as a "turn receiver ON/OFF" service.

Service Layer (or layer 3) services may be divided into two basic classes or types. The first class consists of, but is not exclusively limited to, autonomous services such as run time calibration and the previously mentioned automatic gain control services. Such services take place automatically when an RF circuit is active and can be modelled as finite state machines.

The second class consists of, but is not exclusively limited to commands, which are service requests from the radio protocol stack to the logical architecture layer 303 (also known as layer 2). Examples of 'command' service requests are to set a channel, which sets the receiver or transmitter to receive a specific channel and to receive a frame, which commands the logical architectural layer 303 to produce logical architecture to receive a frame of data.

In order to map these command service requests and thus to control actions of one or more parts of the RF circuitry, the service layer 301 comprises an interpretation mechanism which maps to the logical architectural layer (layer 2) or allows RF implementation from services externally received by the RF. Examples of such external services may be "baseband control" and "multiradio controller (MRC) control".

The following table provides some examples of messages passed between the control interface and the service layer using the RF protocol API 309 interface.

| Interface between layers (A-B) | Interface Name | Message examples (from A to B) | Message examples (from B to A) |
| --- | --- | --- | --- |
| Protocol - Service Layer | RF-protocol API | + Turn ON receiver for GSM at 850 MHz band at start of GSM time slot 1 | + Received signal strength value in dB's<br>+ Receiver configuration acknowledgement |

The interface may be called the RF protocol application programming interface. Thus the uppermost layers of the radio protocol stack passes messages to the service layer which are interpreted by the service layer 301 and the service layer then passes measured values or acknowledgement messages back to the radio protocol stack.

Figure 4:
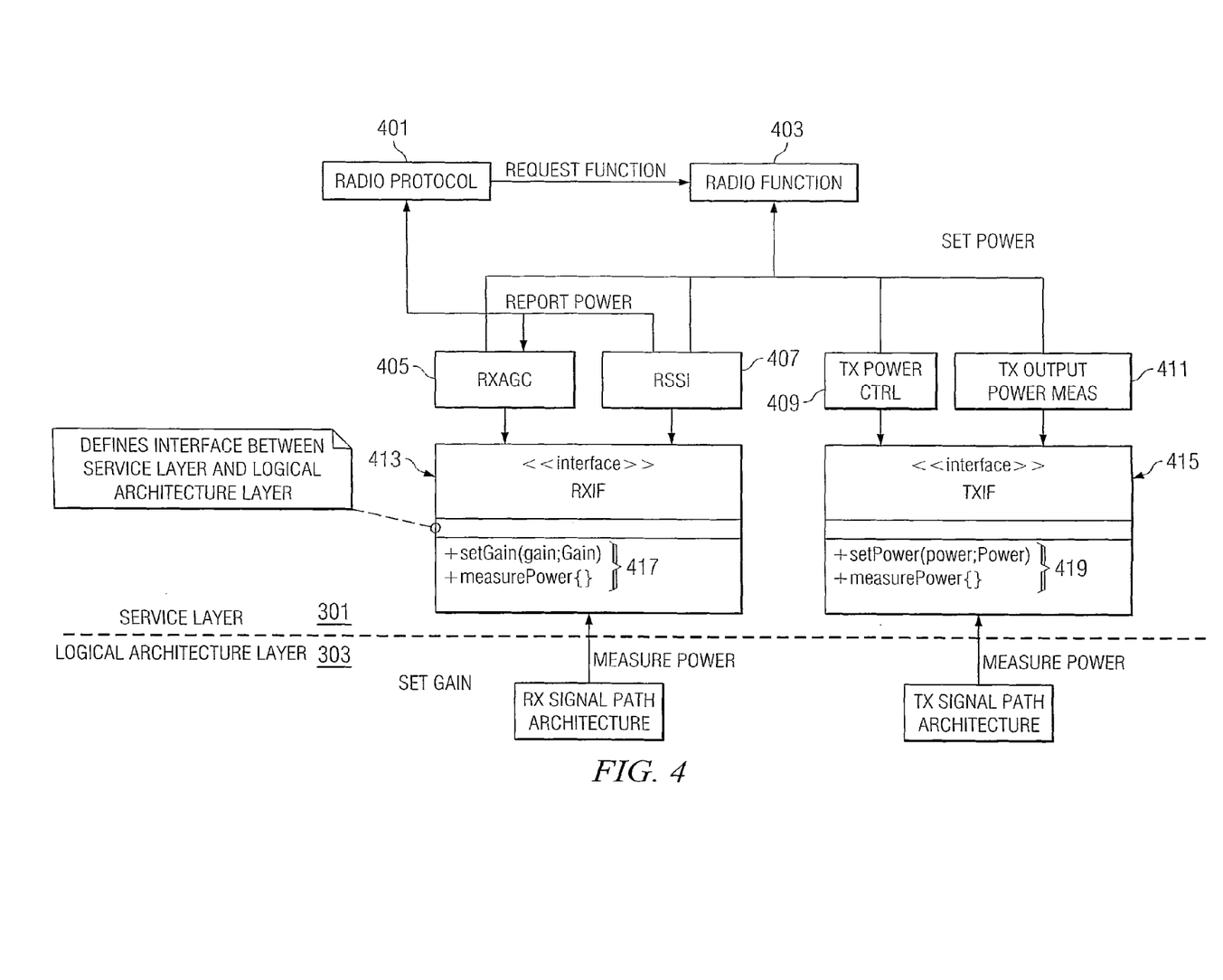
FIG. 4 shows illustratively an example of a service layer structure in accordance with the embodiment shown in FIG. 3.

FIG. 4 shows illustratively an example of the operation of the service layer 301 (layer 3) in relation to the generation of an "automatic gain control (AGC)" and "power output (POUT) control" functions.

The Radio Protocol 401 may request the TX power control service (409) in the service layer to restrict the output power to be below a specific level according to a defined standard specific value. The TX power control service may need to utilise the (possibly) internal TX Output power measure service (411) to comply to the request from the Radio Protocol. Both of the "transmitter (TX) power control" service 409 and a "TX output power measure" service 411 may then via the transmitter interface 415 generate at least one interface command 419 such as setPower, for the "TX power control" service 409 and measurePower for the "TX output power measure" service 411. These interface commands 419 may then be passed to the logical architecture layer 303.

Similarly the radio protocol 401 may require an input value not to exceed some defined value. Within the service layer 403 the RadioFunction generator 403 may thus based on this request create a "automatic gain control (AGC)" function. The automatic gain control (AGC) function may then be interpreted or generated from a "Receive path (RX) automatic gain control set" service 405 and a "received signal strength indicator (RSSI)" service 407. Both of the "Receive path (RX) automatic gain control set" service 405 and a "received signal strength indicator (RSSI)" service 407 may then via the receiver interface 413 generate at least one interface command 417 such as +setGain, for the "Receive path (RX) automatic gain control set" service 405 and a +measurePower for the "received signal strength indicator (RSSI)" service 407. These interface commands 417 may then be passed to the logical architectural layer 303. Furthermore the RSSI service 407 may be configured to pass the received power report to bother the automatic gain control set service 405 and the radio protocol stack 401.

The logical architecture layer 303 (also known as layer 2) defines a signal path structure of the RF application from a control perspective by configuring interfaces between RF logic blocks. The logical architecture layer 303 forms a logic RF architecture description and interface configuration between building blocks to fulfil a service layer service request.

The logical architecture layer 303 may also be used to handle dynamic resource management, resource reservation and resource conflict resolution in embodiments of the present invention where dynamic resource configuration such as described in PCT patent application no. WO 2008/000905 A1 which discloses a method of dynamic resource management.

Examples of the interface communications between the service layer 301 and the architecture layer 303 is shown in the following table.

| Interface between layers (A-B) | Interface Name | Message examples (from A to B) | Message examples (from B to A) |
| --- | --- | --- | --- |
| Service layer - logical architecture layer | RF HAL | + Configure receiver chain for GSM at 850 MHz band at time t1<br>+ set RF gain to previous value or initialize AGC (from measurements during time t2-t3) | + WLAN receiver configuration ready<br>+ WCDMA configuration available |

The interface may be called the Radio Frequency—Hardware Abstraction Layer interface 313. The interface communication from the service layer 301 and the logical architecture layer 303 may be the interface commands such as configure the receiver for a GSM 850 MHz for time t1 or set the power out gain to a specific value or initialize the automatic gain control.

The logical architecture layer 303 (layer 2) therefore abstracts or interprets the requirements and requests from the service layer to indicate the logical architecture required to implement the blocks. Thus for example where the service layer 301 requests a GSM 850 MHz receiver the logical architecture layer 303 selects the receiver that will be required—such as whether to use direct conversion from the RF to the baseband frequencies or whether to use an intermediate frequency discriminator. Furthermore it carries out these abstractions/selections in a way that these issues are invisible to the service layer.

Figure 5:
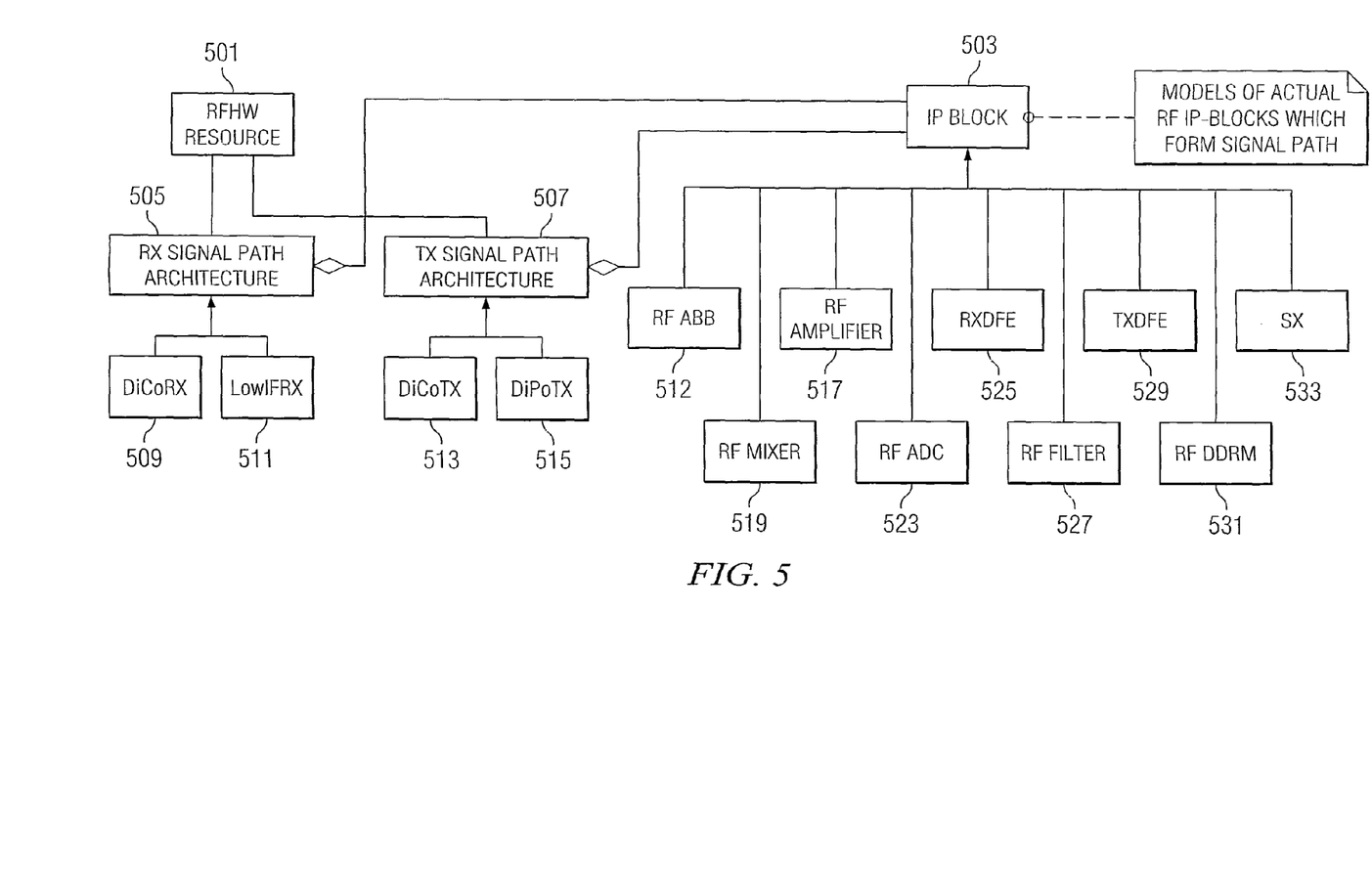
FIG. 5 shows illustratively an example of a logical architecture layer structure in accordance with the embodiment shown in FIG. 3.

With respect to FIG. 5 the structure of the logical architecture layer 303 can be shown. The logical architecture layer 303 has knowledge of the physical architecture models of the physical architecture blocks or elements. Some example IP blocks shown in FIG. 5 include a radio frequency (RF) amplifier block 517, a RF mixer block 519, a RF ABB (analog baseband) block 521, a RF analogue to digital converter (ADC) 523, a Receiver (RX) DFE (Digital front end) block 525, a RF filter 527, a transmitter (TX) DFE 529, a RF DDRM 531 and a Synthesizer (SX) 533.

The models of the blocks share a common format and are types of IP Block 503, inheriting certain functions and interfaces and are the smallest managed resource. The IP Blocks may be selected in response to the requirements of the receiver signal path architecture 505 or the transmitter signal path architecture 507 to construct a signal path architecture connecting up the various IP block element models.

FIG. 5 furthermore shows the model parameters associated with the direct conversion receiver (DiCoRx) 509, the low frequency-intermediate frequency receiver (LowIFRX) 511, the direct conversion transmitter (DiCoTX), and the direct polar transmitter (DiPoTX) which would also affect the model blocks selected by the IP block and the signal path architecture to be selected.

The logical layer thus maps the RF service to a respective architecture and provides functional partitioning at a RF IP block level, and optimises partitioning in the signal processing elements. Thus using the above example of the service layer 301 may select the low frequency intermediate frequency architecture passing to the corresponding logical architecture layer block 511 a service request for a 850 MHz GSM receiver The LowIF block 511 may select the RF amplifier 517, the RF mixer 519, the RF ADC 521 and using its given parameters. Having determined the logical signal architecture requirements these may then be modified and passed the independent blocks on the physical architecture layer 305.

The logical architecture layer 303 forms the core functionality of the HAL 351. The HAL 351 advantageously allows products to be developed more quickly, and permits efficient usage of the RF IP blocks both in terms of architecture management, and dynamic control and usage of different hardware resources.

The physical architecture layer 305 (also known as layer 1) describes a set of physical control features that each radio frequency circuit element may have. The purpose therefore of the physical architecture layer 305 is to model the physical issues associated with each of the RF circuit elements in a standard way.

The following table shows example messages at the communication/interface between the logical architecture layer 303 and the physical architecture layer 305. The interface may be called the IP block application programmable interface 315. The logical architecture layer 303 as described above produces the signal configuration between the various selected radio frequency circuit components, or IP blocks, required to carry out the service request and may pass to the physical architecture layer 305 data which determines the physical model characteristics. For example the message from the logical architecture layer 303 to the physical architecture layer 305 may be to set a low noise amplifier to a specific gain value, or to configure the physical model connections to the type of receiver being implemented. Furthermore as described above the physical architecture layer 305 may pass data back to the logical architecture layer 303 expressing specific limitations that a physical implementation of the logical model may have. For example the physical architecture layer 305 may pass data back to the logical architecture layer 303 specifying the maximum gain, or typical current consumption of an amplifier, or that a synthesizer has a specific settling time. Furthermore the physical architecture layer 305 may pass data back to the logical architecture layer 303 acknowledgement messages for example that the receiver configuration is ready for operation.

| Interface between layers (A-B) | Interface Name | Message examples (from A to B) | Message examples (from B to A) |
|---|---|---|---|
| logical architecture layer - physical architecture layer | IP block API | + set 'LNA_gain' to 20 dB<br>+ configure connections to direct conversion receiver architecture (or to low-IF) | + LNA1 has maximum gain of 20 dB<br>+ Receiver configuration ready<br>+ Synthesizer settling time = 80 us<br>+ LNA1 power_consumption = 3 mA @10 dB of gain |

The physical architecture layer 305 model the physical issues associated with each of the RF circuit elements may be for example how to standardise control of the attributes, for example the performance gain, for each RF IP block.

An RF circuit element or block may have zero or more functions which may be controlled and/or monitored. Examples of attributes which may be controlled/monitored are:

"PeripheralDevice"—this attribute models access to the radio frequency circuit block configuration/status registers.

"Amplifier"—this attribute models the amplification value of the radio frequency circuit block. Where the gain in a radio frequency circuit block is controllable, this attribute may indicate the range of controllability of gain, for example maximum-minimum gain, the gain step.

"PhaseNoise"—this attribute models the phase noise of a voltage controlled oscillator (VCO) or synthesiser. The phase noise is an adjustable parameter enabling optimisation of a VCO performance in the logical architecture layer 303. This parameter is defined in the physical architecture layer because the parameter is dependent upon a particular implementation and cannot thus be generalised. In some embodiments of the invention the "Phase Noise" parameter represents a simplified model which may be used for more than one implementation. In other embodiments of the invention the particular transceiver implementation internally measures its own performance from the hardware implementation layer and records a value indicative of its performance into a memory.

The physical architecture layer 305 thus includes implementation-aware or specific radio frequency circuit block drivers and as described above may define necessary hardware parameters which can be reported as parameters to the logical architecture layer 303.

The physical architecture layer 305 may also map controls parameters passed to the layer from the logical architecture layer 303 to logical register names for implementation in the hardware implementation layer 307.

Figure 6:
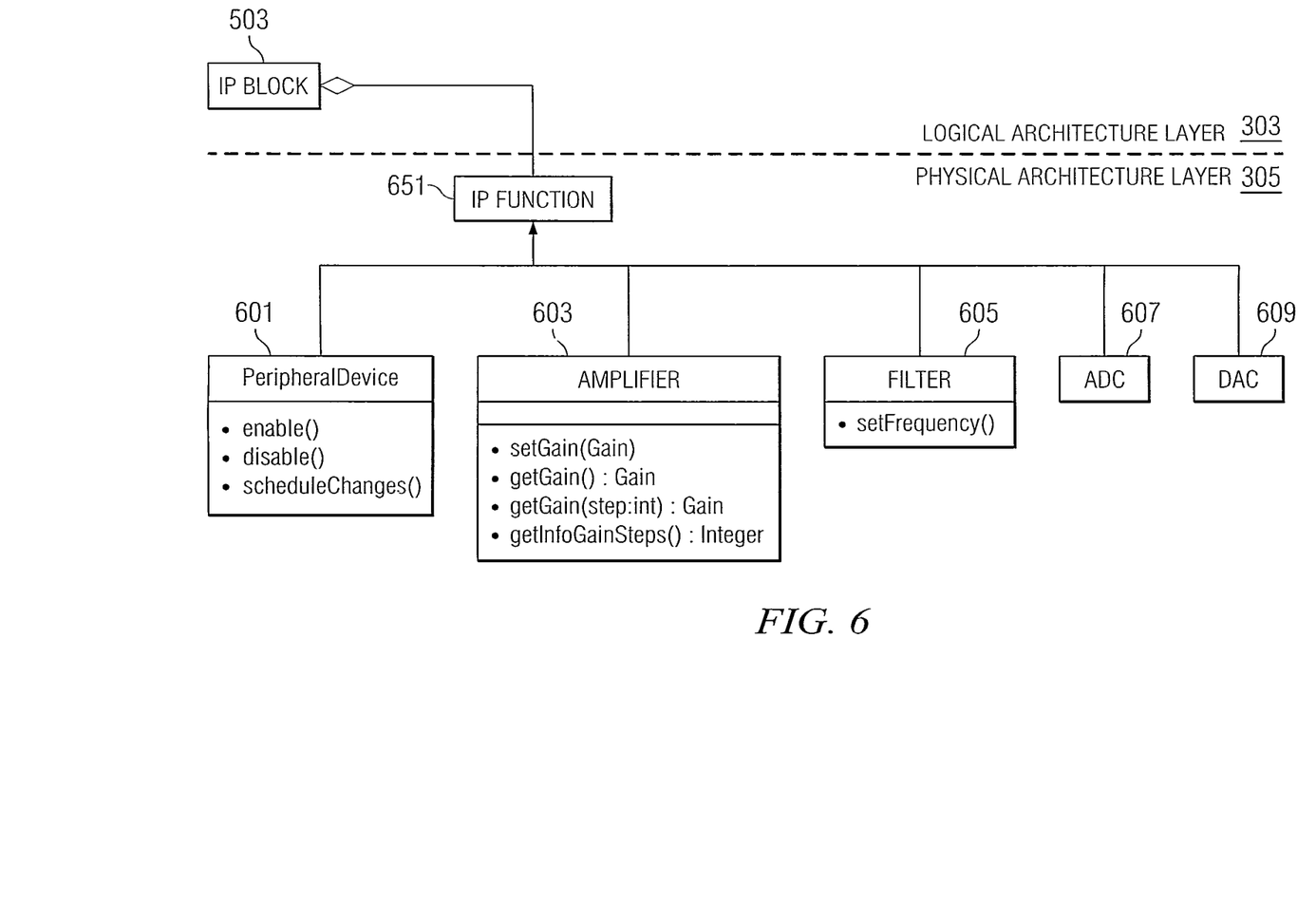
FIG. 6 shows illustratively an example of a physical architecture layer and hardware implementation layer structure in accordance with the embodiment shown in FIG. 3.

FIG. 6 shows an example some of the control features/attributes that may be provided in the physical architecture layer 305. The physical architecture layer 305 comprises a series of control features, or functions, exhibited by at least some of the IP blocks defined in the Logical Architecture Layer 303. Those shown in FIG. 6 comprise PeripheralDevice 601, Amplifier 603, Filter 605, Analogue to Digital Converter (ADC) 607, and Digital to Analogue Converter (DAC) 609. The PeripheralDevice 601 model comprises the controllable attributes: enable—to enable communication with the physical device, disable—to disable communication with the physical device, and schedulechange. The Amplifier 603 model may comprise the functions setGain—which sets the amplifier gain, getGain—which may retrieve the max/min gain value and the step change function of the gain, getNofGainSteps—which may retrieve the number of gain steps the implementation of the amplifier is able to accept. The Filter 605 model may comprise the setFrequency function—which may set the centre frequency for a notch filter or a cut off for a high or low pass filter.

It would be understood by the person skilled in the art that further physical models providing control features for each of IP blocks may use different functions to the examples provided below to control the physical results of the circuits.

The Hardware implementation layer (also known as the layer 0) links the physical architecture defined in the in the physical architecture layer 305 to the RF circuit blocks by means of low level hardware specific drivers. These low level hardware drivers abstract low-level RF implementation details from upper driver layers (that is, the physical architecture layer 305 and logical architecture layer 303) and enable the interface between the RF circuit blocks in a RF software architecture.

The following table illustrates by example the interface between the physical architecture layer 305 and the hardware implementation layer 307. The interface enables the physical transfer of values from the physical architecture layer 305 via the hardware implementation layer 307 to the registers within the radio frequency circuit blocks which control the operation of the radio frequency circuit block. This interface may be known as the hardware driver application programming interface 317.

| Interface between layers (A-B) | Interface Name | Message examples (from A to B) | Message examples (from B to A) |
|---|---|---|---|
| physical architecture Layer - hardware implementation layer | HW Driver API | + write LNA gain = 20 dB to register 'LNA1_gain' (one register has the exact logical value of 20 dB -> verified earlier) + read implemented register values of 'LNA1_gain' | + read RSSI register value from 'RSSI' (value already translated to a useful unit like dB) |

For example the interface may allow the transfer of data from the physical architecture layer 305 such as the instruction to the hardware implementation layer 307 to write the gain value to a specific register in an amplifier circuit block or to instruct the hardware implementation layer 307 to read from a register in the amplifier circuit block. The interface furthermore enables interpreted register values to be passed up to the higher control layers. For example a received signal strength indicator value may be read from a register, be interpreted within the hardware implementation layer and then passed up to the physical architecture layer 305 for further processing.

The hardware implementation layer 307 may convert abstract values such as radio HW configuration, gain, power, etc, relating to the IP block models provided in the Logical Architecture layer 303 and the Physical Architecture layer 305 to configuration register bit pattern(s) capable of being written to the physical RF circuit blocks.

Furthermore the hardware implementation layer 307 drivers may provide a consistent interface to the radio frequency circuit blocks, enabling compatible blocks to be easily plugged in and out as part of a flexible and dynamic radio system. The hardware implementation level low level drivers may in some embodiments be considered to be a part of an RF IP circuit block, and may be provided by the designer or vendor of the RF circuit block.

As described above an example of a hardware implementation layer 307 operation is that of interpreting a required gain value from the physical architecture level 305 converting the required gain value into a configuration register bit pattern compatible with the control register in the radio frequency circuit block and then passing the register bit pattern to the radio frequency circuit block in order to configure a desired gain setting for the RF circuit block.

The layered HAL configuration enables design and configuration flexibility for architectural changes both in relation to hardware and software. The separation of the HAL in such a way thus advantageously allows development work to be divided between several parties since each party is aware of features of the layer they are required to design for.

The HAL layered presentation furthermore permits flexibility of configuration and control of the RF circuit blocks and allows parts of an RF circuit developed by different parties to be integrated in a modular fashion. It is furthermore possible to introduce new RF circuitry blocks into a existing design without requiring significant redesign of the existing circuit blocks or control layers. Furthermore the separation of the layers enables maintenance of the RF circuit blocks to be performed more conveniently, thus reducing the burden of maintenance. Furthermore such a structure, provided there is at least one redundant module permits the possibility of reconfiguration of radio frequency circuit blocks to overcome circuit failure. Also due to the logical hierarchy the complexity of any specific arrangement may be reduced.

Some advantageous examples of how to utilize the HAL are given in the following.

a new radio protocol is introduced for an existing SDR system on chip (SoC) platform. In this case, the protocol is formed by creating a suitable set of service layer services which uses the interface between the logical architecture layer and the service layer. Typically this will be achieved by parametrizing or refining existing services.

Obtaining RF circuit design information from an external vendor. In this case a single RF circuit block such as an low noise amplifier (LNA) can be added to the RF SoC by configuring a low level driver of the RF IP block to be consistent with the interface between the hardware implementation layers and the physical architecture layer.

Changing processor subsystem timers and clocking in order to achieve improved timing accuracy. Since common "control SW time" is only visible in the logical architecture layer, the change is local to that layer and drivers in other layers are unaffected.

Adding a new control parameter for RF SoC, for example relating to power consumption. This parameter can be conveniently added as a new physical architecture layer physical control feature associated to an circuit block. Notably, representing a feature is dealt with in the layer 1; using the feature is dealt with in the logical architecture layer.

Since the number of operational modes and required number of parameter tunings necessary for upcoming multi-radio SDR devices is vast, the HAL provides a convenient approach to implementation.

It should be appreciated that while the embodiment refers to a single radio protocol stack, a control interface can be provided for more than one radio protocol stack using the HAL; that is, realisation of the control interface can, in a logical sense, use the same physical implementation.

It should also appreciated that while the embodiment is described in relation to a single signal processing part of the RF hardware, the invention may be applied using the HAL to more than one such part, irrespective of how such parts are implemented in the RF hardware.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
at least one processor; and
at least one memory including executable instructions, the at least one memory and the executable instructions being configured to, in cooperation with the at least one processor, cause the apparatus to perform at least the following:
translate, via a first layer, at least one radio protocol command to at least one radio service;
generate, via the first layer, at least one service request, wherein the at least one service request corresponds to the at least one radio service;
determine, via a second layer, at least one logical architecture model dependent on each service request, wherein the at least one radio service is mapped to at least one radio transceiver circuit of a plurality of radio transceiver circuits and mapped to a signal path between the at least one radio transceiver circuit and at least one other radio transceiver circuit of the plurality of radio transceiver circuits;
define, via a third layer to form a physical architecture structure dependent on each logical architecture model, at least one controllable attribute of the at least one mapped radio transceiver circuit; and
generate, via a fourth layer, at least one configuration data set providing linkage between the at least one controllable attribute and the at least one mapped radio transceiver circuit.

2. An apparatus according to claim 1, wherein the at least one memory and the executable instructions are configured to, in cooperation with the at least one processor, cause the apparatus to further perform at least the following:
write the at least one configuration data set to the at least one mapped radio transceiver circuit.

3. An apparatus according to claim 1, wherein the at least one configuration data set comprises at least one value for a parameter associated with the at least one mapped radio transceiver circuit.

4. An apparatus according to claim 1, wherein the at least one memory and the executable instructions are configured to, in cooperation with the at least one processor, cause the apparatus to further perform at least the following:
map the at least one radio service to at least one radio transceiver circuit of the plurality of radio transceiver circuits further dependent on the at least one configuration data set.

5. An apparatus according to claim 1, wherein the at least one memory and the executable instructions are configured to, in cooperation with the at least one processor, cause the apparatus to further perform at least the following:
receive configuration data, associated with the at least one mapped radio transceiver circuit, comprising an indication of at least one of:
a radio communication protocol;
a radio frequency;
a modulation type;

a transmission power output limit; and
a timing slot value.

6. An apparatus according to claim 1, wherein the at least one memory and the executable instructions are configured to, in cooperation with the at least one processor, cause the apparatus to further perform at least the following:
translate, via the first layer, at least one further radio protocol command to at least one further radio service;
generate, via the first layer dependent on the at least one service request, at least one further service request, wherein the at least one further service request corresponds to the at least one further radio service.

7. An apparatus according to claim 6, wherein the at least one memory and the executable instructions are configured to, in cooperation with the at least one processor, cause the apparatus to further perform at least the following:
determine, via the second layer, at least one further logical architecture model dependent on the at least one further service request, wherein the at least one further radio service is mapped to at least one further radio transceiver circuit of the plurality of radio transceiver circuits;
define, via the third layer to form a physical architecture structure dependent on each further logical architecture model, at least one further controllable attribute, wherein the at least one further controllable attribute is of the at least one mapped further radio transceiver circuit; and
generate, via the fourth layer, at least one further configuration data set providing linkage between the at least one further controllable attribute and the at least one mapped further radio transceiver circuit.

8. A method, comprising:
translating, via a first layer, at least one radio protocol command to at least one radio service;
generating, via the first layer, at least one service request, wherein the at least one service request corresponds to the at least one radio service;
determining, via a second layer, at least one logical architecture model dependent on each service request, wherein the at least one radio service is mapped to at least one radio transceiver circuit of a plurality of radio transceiver circuits and mapped to a signal path between the at least one radio transceiver circuit and at least one other radio transceiver circuit of the plurality of radio transceiver circuits;
defining via a third layer to form a physical architecture structure dependent on each logical architecture model, at least one controllable attribute of the at least one mapped radio transceiver circuit; and
generating, via a fourth layer, at least one configuration data set providing linkage between the at least one controllable attribute and the at least one mapped radio transceiver circuit.

9. A method according to claim 8, further comprising writing the at least one configuration data set to the at least one mapped radio transceiver circuit.

10. A method according to claim 8, wherein the at least one configuration data set comprises at least one value for a parameter associated with the at least one mapped radio transceiver circuit.

11. A method according to claim 8, further comprising mapping the at least one radio service to at least one radio transceiver circuit of the plurality of radio transceiver circuits further dependent on the at least one configuration data set.

12. A method according to claim 8, further comprising receiving configuration data, associated with the at least one mapped radio transceiver circuit, comprising an indication of at least one of:
a radio communication protocol;
a radio frequency;
a modulation type;
a transmission power output limit; and
a timing slot value.

13. A method according to claim 8, further comprising:
translating, via the first layer, at least one further radio protocol command to at least one further radio service;
generating, via the first layer dependent on the at least one service request, at least one further service request, wherein the at least one further service request corresponds to the at least one further radio service.

14. A method according to claim 13, further comprising:
determining, via the second layer, at least one further logical architecture model dependent on the at least one further service request, wherein the at least one further radio service is mapped to at least one further radio transceiver circuit of the plurality of radio transceiver circuits;
define, via the third layer to form a physical architecture structure dependent on each further logical architecture model, at least one further controllable attribute, wherein the at least one further controllable attribute is of the at least one mapped further radio transceiver circuit; and
generating, via the fourth layer, at least one further configuration data set providing linkage between the at least one further controllable attribute and the at least one mapped further radio transceiver circuit.

15. A computer program product comprising computer executable program code recorded on a non-transitory computer readable storage medium, the computer executable program code comprising:
code for causing an associated apparatus to translate, via a first layer, at least one radio protocol command to at least one radio service;
code for causing the associated apparatus to generate, via the first layer, at least one service request, wherein the at least one service request corresponds to the at least one radio service;
code for causing the associated apparatus to determine, via a second layer, at least one logical architecture model dependent on each service request, wherein the at least one radio service is mapped to at least one radio transceiver circuit of a plurality of radio transceiver circuits and mapped to a signal path between the at least one radio transceiver circuit and at least one other radio transceiver circuit of the plurality of radio transceiver circuits;
code for causing the associated apparatus to define, via a third layer to form a physical architecture structure dependent on each logical architecture model, at least one controllable attribute of the at least one mapped radio transceiver circuit; and
code for causing the associated apparatus to generate, via a fourth layer, at least one configuration data set providing linkage between the at least one controllable attribute and the at least one mapped radio transceiver circuit.

16. A computer program product according to claim 15, further comprising code for causing the associated apparatus to write the at least one configuration data set to the at least one mapped radio transceiver circuit.

17. A computer program product according to claim 15, further comprising code for causing the associated apparatus to map the at least one radio service to at least one radio transceiver circuit of the plurality of radio transceiver circuits further dependent on the at least one configuration data set.

18. An apparatus according to claim 1, wherein said first, second, third and fourth layers are layers of a hardware abstraction layer.

19. A method according to claim 8, wherein said first, second, third and fourth layers are layers of a hardware abstraction layer.

20. A computer program product according to claim 15, wherein said first, second, third and fourth layers are layers of a hardware abstraction layer.

\* \* \* \* \*